(12) United States Patent
Wang et al.

(10) Patent No.: US 9,330,690 B2
(45) Date of Patent: May 3, 2016

(54) METHOD OF FORMING A TAMR WRITER WITH A CONCAVE LEADING SHIELD FOR ENHANCED FIELD MAGNITUDE

(71) Applicant: Headway Technologies, Inc., Milpitas, CA (US)

(72) Inventors: Yiming Wang, San Jose, CA (US);
Tobias Maletzky, San Jose, CA (US);
Xuhui Jin, San Jose, CA (US); Dayu Zhou, Fremont, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 98 days.

(21) Appl. No.: 14/139,051

(22) Filed: Dec. 23, 2013

(65) Prior Publication Data

US 2014/0123473 A1 May 8, 2014

Related U.S. Application Data

(62) Division of application No. 13/668,468, filed on Nov. 5, 2012, now Pat. No. 8,630,153.

(51) Int. Cl.
*G11B 5/127* (2006.01)
*H04R 31/00* (2006.01)
*G11B 5/11* (2006.01)
*G11B 5/31* (2006.01)
*G11B 5/60* (2006.01)
*G11B 5/00* (2006.01)

(52) U.S. Cl.
CPC .............. *G11B 5/112* (2013.01); *G11B 5/1278* (2013.01); *G11B 5/314* (2013.01); *G11B 5/6088* (2013.01); *G11B 2005/0021* (2013.01); *Y10T 29/49048* (2015.01)

(58) Field of Classification Search
CPC ...... G11B 5/314; G11B 5/112; G11B 5/1278; G11B 5/6088; G11B 2005/0021; G11B 5/3116; G11B 5/3163; G11B 5/31; Y10T 29/49032; Y10T 29/49043; Y10T 29/49044; Y10T 29/49046; Y10T 29/49048
USPC ............... 29/603.07, 603.13–603.16, 603.18; 360/121, 122, 126, 317; 369/13.02, 369/13.13, 13.17, 13.32, 13.33
See application file for complete search history.

(56) References Cited

U.S. PATENT DOCUMENTS

| | | | |
|---|---|---|---|
| 7,042,682 B2 | 5/2006 | Hu et al. | |
| 8,035,930 B2 | 10/2011 | Takano et al. | |
| 8,036,069 B1 * | 10/2011 | Jin et al. | 369/13.32 |

(Continued)

*Primary Examiner* — Paul D Kim
(74) *Attorney, Agent, or Firm* — Saile Ackerman LLC; Stephen B. Ackerman

(57) ABSTRACT

A method of forming a TAMR (Thermal Assisted Magnetic Recording) write head that uses the energy of optical-laser excited plasmons to locally heat a magnetic recording medium and reduce its coercivity and magnetic anisotropy. The magnetic field of the write head is enhanced by the formation of a leading shield that is formed in a concave geometrical shape and partially surrounds the waveguide portion of the head within the concavity, which allows the distal end of the waveguide to extend to the ABS plane of the write head. This arrangement reduces the gap between the shield and the magnetic pole and does not interfere with the ability of the waveguide to efficiently transfer its optical energy to the plasmon generator and, ultimately, to the surface of the magnetic recording medium.

5 Claims, 5 Drawing Sheets

(56) References Cited

U.S. PATENT DOCUMENTS

| | | |
|---|---|---|
| 8,059,496 B1 | 11/2011 | Zhou et al. |
| 8,233,358 B2 | 7/2012 | Zhou et al. |
| 8,295,132 B2 | 10/2012 | Jin et al. |
| 8,493,821 B1 * | 7/2013 | Sasaki et al. ............... 369/13.33 |
| 8,599,656 B2 | 12/2013 | Jin et al. |
| 8,848,495 B1 * | 9/2014 | Wu et al. .................... 369/13.33 |
| 2012/0084969 A1 | 4/2012 | Tanaka et al. |
| 2012/0292287 A1 * | 11/2012 | Araki et al. ..................... 216/22 |

* cited by examiner

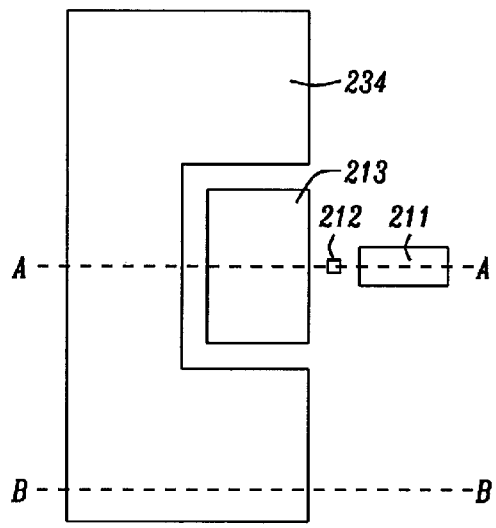
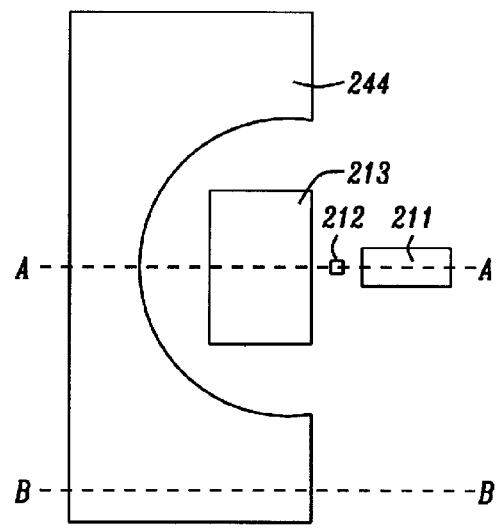
FIG. 7a  FIG. 8a
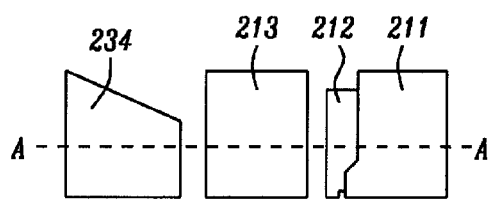
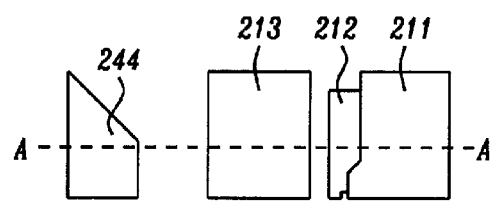
FIG. 7b  FIG. 8b
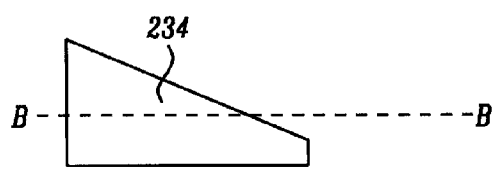
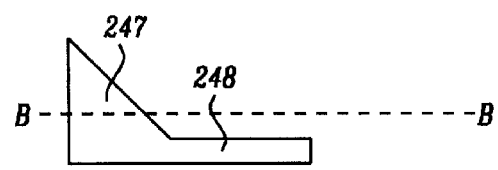
FIG. 7c  FIG. 8c

METHOD OF FORMING A TAMR WRITER WITH A CONCAVE LEADING SHIELD FOR ENHANCED FIELD MAGNITUDE

This is a Divisional Application of U.S. patent application Ser. No. 13/668,468 filed on Nov. 5, 2012 now U.S. Pat. No. 8,630,153, which is herein incorporated by reference in its entirety and assigned to a common assignee.

RELATED PATENT APPLICATION

This Application is related to Ser. No. 13/316,989, Filing Date Dec. 12, 2011, now US Publ. Pat. Appl. US 2012/0020194, assigned to the same assignee as the present Application.

BACKGROUND

1. Technical Field

This application relates to magnetic write heads that employ TAMR (thermally assisted magnetic recording) to enable perpendicular writing on magnetic media having high coercivity and high magnetic anisotropy. More particularly, it relates to the use of a concave leading shield configuration that enhances the strength of the magnetic write field.

2. Description

Magnetic recording at area data densities of between 1 and 10 Tera-bits per $in^2$ involves the development of new magnetic recording media, new magnetic recording heads and, most importantly, a new magnetic recording scheme that can delay the onset of the so-called "superparamagnetic" effect. This latter effect is the thermal instability of the extremely small regions of magnetic material on which information must be recorded, in order to achieve the required data densities. A way of circumventing this thermal instability is to use magnetic recording media with high magnetic anisotropy and high coercivity that can still be written upon by the increasingly small write heads required for producing the high data density. This way of addressing the problem produces two conflicting requirements:
1. The need for a stronger writing field that is necessitated by the highly anisotropic and coercive magnetic media.
2. The need for a smaller write head of sufficient definition to produce the high areal write densities. Such a write head, disadvantageously, produces a smaller field gradient and broader field profile.

Satisfying these requirements simultaneously may be a limiting factor in the further development of the present magnetic recording scheme used in state of the art hard-disk-drives (HDD). If that is the case, further increases in recording area density may not be achievable within those schemes. One way of addressing these conflicting requirements is by the use of assisted recording methodologies, notably thermally assisted magnetic recording, or TAMR.

Prior art forms of assisted recording methodologies being applied to the elimination of the above problem share a common feature: transferring energy into the magnetic recording system through the use of physical methods that are not directly related to the magnetic field produced by the write head. If an assisted recording scheme can produce a medium-property profile to enable low-field writing localized at the write field area, then even a weak write field can produce high data density recording because of the multiplicative effect of the spatial gradients of both the medium property profile and the write field.

The heating effect of TAMR works by raising the temperature of a small region of the magnetic medium to essentially its Curie temperature ($T_C$), at which temperature both its coercivity and anisotropy are significantly reduced and magnetic writing becomes easier to produce within that region.

In the following, we will address a particular implementation of TAMR, namely the transfer of electromagnetic energy to a small, sub-micron sized region of a magnetic medium through interaction of the magnetic medium with the near field of a plasmon excited by an optical frequency laser. The transferred electromagnetic energy then causes the temperature of the medium to increase locally.

The plasmon is typically excited in a particularly shaped plasmon generator (PG) that is incorporated within the read/write head structure. The source of optical excitement can be a laser diode, also contained within the read/write head structure, or a laser source that is external to the read/write head structure, either of which directs its beam of optical radiation at the PG through a means of intermediate transfer such as an optical waveguide (WG). As a result of the WG, the optical mode of the incident radiation couples to a propagating edge plasmon mode in the PG, whereby the optical energy is converted into plasmon energy that travels along the PG. This plasmon energy is then focused by the PG onto the medium, at which point the heating occurs. When the heated spot on the medium is correctly aligned with the magnetic field produced by the write head pole, TAMR is achieved.

In a perpendicular magnetic recording (PMR) write head, which is now used for high density recording in magnetic media having soft magnetic underlayers (SUL), the strength of the magnetic field is already sufficient for the writing process. Therefore, in the PMR head system, it is the field gradient that must be improved. This is done by the use of shields.

In the TAMR system, however, due to defects in the media and large variations in grain sizes, a high magnetic field is desirable for good recording quality. Unfortunately, the SUL effect is much weaker due to media limitations so an alternative approach is needed to improve TAMR writability.

These issues are discussed by Hu et al. (US Publ. Pat. Appl. 2005/0083605 A1), Tanaka et al (US Publ. Pat. Appl. 2012/0084969), Takano et al. (U.S. Pat. No. 8,035,930 B2), Zhou et al. (U.S. Pat. No. 8,059,496) and Jin et al., US. Publ. Pat. Appl. 2012/0020194 (assigned to the present assignee and fully incorporated herein by reference), but an alternative approach is not provided.

SUMMARY

It is a first object of this disclosure to produce a TAMR writer whose magnetic field is enhanced and that, as a result, does not require the assistance of the medium underlayer structure, such as a magnetically soft underlayer.

It is a second object of this disclosure to satisfy the first object by a means that does not interfere with or degrade the optical and thermal performance of the TAMR writer.

These objects will be realized by means of a leading shield that can be constructed at a position that is close to the main magnetic pole of the writer where it can be used to enhance the write field. In TAMR heads the main magnetic pole (MP) is located close to the plasmon generator (PG) and waveguide (WG) area. Because the WG has a large volume and is literally in front of the MP, it is extremely difficult if not impossible to position a leading shield in the same area.

Referring to FIGS. 1($a$) and 1($b$), there are shown two schematic side-view illustrations showing elements of a TAMR head that differ only in a possible position of a leading shield. The ABS of the head (1) is at the bottom of the figure. An arrow shows the direction of recording medium motion and points into the leading edge of the head. The rectangle (21) depicts the waveguide (WG). The rectangle (23) represents the main magnetic pole (MP). A plasmon generator (22) is shown here as abutting the main pole. If a leading shield were to be formed, it might occupy one of two possible regions, shown as rectangle (35) in FIG. 1(a) and rectangle (37) in FIG. 1(b). In FIG. 1(a) the shield (35) is interposed between the distal end (211) of the WG and the ABS itself. Shield location (35), interposed directly between the distal end of the WG and the ABS, would effectively raise the distal end (211) of the WG and recess it relative to the ABS of the head (1), which would reduce the efficiency of the WG by reducing its overlap with the plasmon generator (22). Alternatively, as illustrated in FIG. 1(b), the leading shield (37) could be placed completely to the leading edge side of the WG, allowing the WG to reach the ABS, in which case edge (211) would be at the ABS (1). This would create a large separation, shown as (50), between the shield and the MP (23) and its role would be diminished, leading to a reduction of the recording field magnitude. The gap (50) between the shield and the leading edge of the pole tip (23) will be seen, in FIG. 2, to be important in determining the perpendicular field magnitude experienced by the recording medium.

If the WG is recessed from the ABS plane to allow sufficient room for shield placement, as schematically illustrated above in FIG. 1(a), then the optical efficiency of the WG/PG combination drops by approximately 10%. In a thermally dominant TAMR, which emphasizes thermal gradient and optical efficiency, the drop in optical performance in exchange for magnetic field improvement is not desirable. Therefore it is not feasible to directly add a leading shield close to the MP. A method for overcoming this difficulty, as will be presented herein, is to form a leading shield that is partially wrapped around the WG, a "concave leading shield" (CLS) design.

Referring to FIG. 2, there is shown a graphical illustration of modeling results for a TAMR with a leading shield, where the gap between the leading shield and the MP is varied as shown. When the gap was reduced, the field magnitude was improved significantly (between 20%-50% compared to simply interposing a pedestal between the WG and the MP (>600 nm away).

Referring next to FIGS. 3 (a), (b), (c) and (d), there is shown a sequence of schematic illustrations of the concave leading shield (CLS) of this disclosure, The CLS structure is formed of magnetic materials in proximity to the waveguide as can be seen in the cross-sectional views along the down-track, or z-direction of FIG. 3(a). For purposes of descriptive clarity, a set of Cartesian axes in FIG. 3(a) show the x-direction (emerging from the figure plane) to be the cross-track direction, the z-direction to be the down-track direction (from leading to trailing edges) and the y-direction to be the "vertical" direction, directed towards the distal, or ABS end (shown as a dashed-line) of the head.

As shown schematically in the y-z planar view of FIG. 3(a), a TAMR head is composed of an optical delivery portion and a magnetic writer. The portions that will be of particular interest to this disclosure are encircled in a broken-line rectangle (15). The elements are numbered simply in this figure from (1) to (10), but these reference numerals will change in succeeding figures. The optical structure components of the head include the waveguide (WG) (4) and the plasmon generator (PG) (3). The WG propagates the optical energy from a laser diode (not shown) on the slider to the PG, where the near field of a plasmon mode concentrates electromagnetic energy on the recording medium (at the ABS) to create a localized spot on which writing will more easily occur.

The magnetic writer structure has a magnetic main pole (1), a concave leading shield (CLS) (2), a pedestal (5) supporting the CLS, a return pole (6) beneath the pedestal, a back gap (7), a yoke (8) and multiple turns of electric energizing coils (9) (shown as cross-sections) that also extend behind (negative y-direction) the back gap. When the writer is driven by current in the coils, these magnetic components form a complete magnetic circuit that allows the magnetic flux to flow from the leading shield to the magnetic pole and create a sufficient write field in the write gap (10) to penetrate the recording medium and remagnetize the medium within the heated spot, where its coercivity has been reduced. The write gap is here the space, in the down-track (z-direction) direction, between the pole (1) and the front tip of the shield (2).

FIGS. 3(b)-3(d) are enlarged and isolated views of portions (in (15)) of FIG. 3(a) near the WG and PG area, showing the structures in greater detail and through slightly different cross-sectional planes. FIG. 3(b) is a vertical cross-sectional plane (y-z plane) taken through the center plane of the writer, denoted as plane A in FIG. 3(c).

FIG. 3(c) is an ABS view of the writer showing the edge of the central plane A, going into the plane of the figure, which is the cross-sectional plane of FIG. 3(b). Finally, FIG. 3(d), like FIG. 3(b), is taken through a vertical cross-sectional plane, but this plane is denoted as B in FIG. 3(c).

FIG. 3(c) shows clearly the concave shape (with a rectangular inner perimeter) of the leading shield (2), forming two side pieces (20) that partially surround the WG (4) on its lateral sides. The distal ends of the WG (4), the PG (3) and the main pole (1) are also shown. The inner opening in the CLS allows the distal end of the WG to extend to the ABS, where (as shown in FIG. 3(a)) it is co-planar with the distal ends of the pole (1), the PG (3), the ABS side of the CLS and the pedestal (5).

Relevant dimensions of the elements described above (and below) are:
WG: x-dimension approximately 600 nm, z-dimension approximately 400 nm
CLS: inner opening x-dimension (arrow (40)) approximately 800 nm, z-dimension approximately 500 nm. Outer x-dimension (arrow (30))>2000 nm.
CLS thickness y-dimension between 200 and 500 nm.
Pole tip: x-dimension approximately 100 nm.

FIG. 3(b) shows the vertical cross-section (y-z plane) through center-line A, clearly indicating the sequence of elements, main pole (1), plasmon generator (3), waveguide (4) and a portion of the concave leading shield (2).

FIG. 3(d), through the y-z plane at plane B, shows the full cross-section of the concave leading shield (2).

The concave leading shield structure should be fabricated of magnetic materials having a high saturation moment, >=19 kG. But there is no need to use excessively high moment materials since the shield is already placed at a distance from the main pole and the field enhancement effect becomes fairly insensitive to the magnetic moment.

It is to be noted that the fabrication of the TAMR writer with the concave leading shield of this disclosure requires no alteration of current fabrication techniques for other TAMR writers. Referring back to FIG. 3(a): first there is a basic formation sequence of the pole (1), back gap (7) coil (9) and yoke (8). Then the CLS is plated in the following sequence: plating of the pedestal (5), chemical mechanical polishing, plating of the CLS on the pedestal, further chemical mechanical polishing; ion beam etch (IBE)/reactive ion etch (RIE) for waveguide (4) fabrication and positioning of waveguide through CLS. Final steps of IBE/RIE.

Referring next to FIG. 4, there is shown the results of a simulation that displays the magnetic flux flow from the CLS to the main pole. The axes of the figure are the down-track direction (z-direction in all other figures), the cross-track direction (x-direction in all other figures), and the vertical direction (y-direction in all other figures). The units of length are nanometers (nm). The flux, which is represented schematically by three curved arrows (30), flows from the CLS (2) to the main pole (1) and enhances the head's field magnitude. Small arrows filling the outlines of the shield and pole represent the magnetization of these portions of the writer. In the center part of the shield, the magnetization points towards the MP. On both sides of the shield, the magnetizations tilt horizontally towards the MP. Therefore, the magnetic materials of the shield, located alongside the WG, help to reduce the effective distance from the CLS to the main pole and contributes to both a higher field magnitude and more rapid field saturation for the TAMR writer.

Simulations of the optical properties of the head, both with and without the CLS, indicate that the CLS does not (adversely or otherwise) affect the optical performance of the head. In addition, it can also be shown that the presence of the CLS does not increase head temperature, so head reliability is not sacrificed for a higher magnetic field.

BRIEF DESCRIPTION OF THE DRAWINGS

The objects, features, and advantages of the present disclosure are understood within the context of the Description of the Preferred Embodiments as set forth below. The description of each embodiment is understood within the context of the accompanying figures, wherein:

FIG. 7(a)-7(c) are schematic cross-sectional views of a TAMR writer formed according to Embodiment 3 of the present application.

FIG. 8(a)-8(c) are schematic cross-sectional views of a TAMR writer formed according to Embodiment 4 of the present application, where the inner periphery of the CLS is circular or elliptical.

DETAILED DESCRIPTION

Each of the four embodiments of this disclosure, described in detail below, is a TAMR head shielded by a concave leading shield (CLS).

Embodiment 1

Figure 1A:
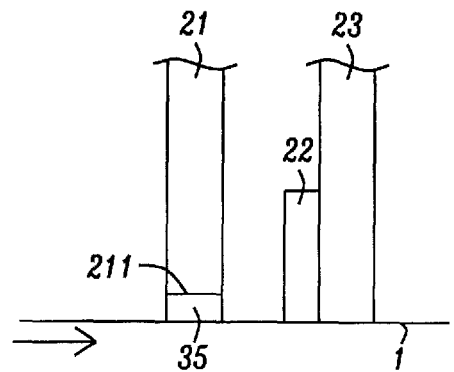
FIGS. 1(a) and 1(b) are schematic illustrations of a TAMR writer with possible positions of a leading edge shield, indicating that a leading edge shield could not be advantageously positioned.
Figure 1B:
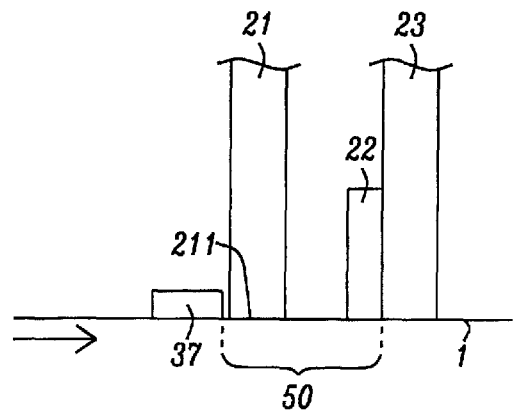
Figure 2:
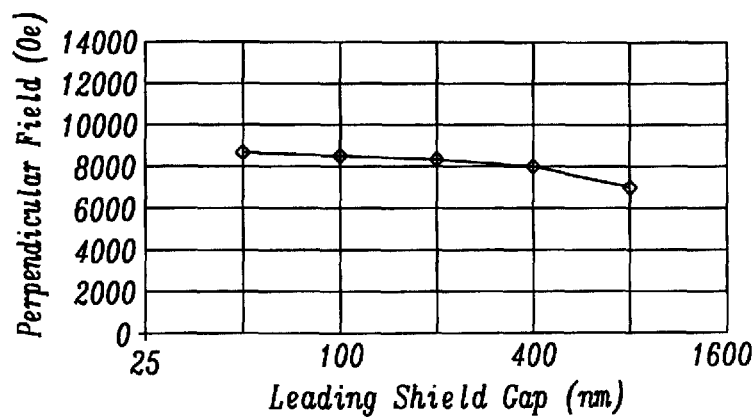
FIG. 2 is a graphical representation showing the relationship between writer field at the recording medium and separation between a leading shield and the MP of the writer.
Figure 3A:
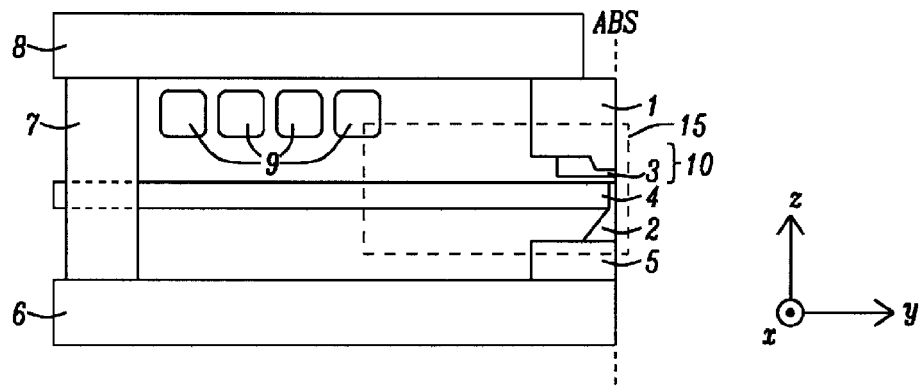
FIGS. 3(a)-3(d) are schematic cross-sectional illustrations, in various planes, of a concave leading shield (CLS) structure.
Figure 3B:
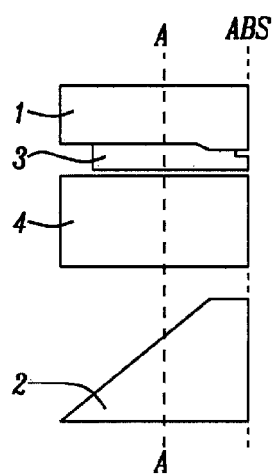
Figure 3C:
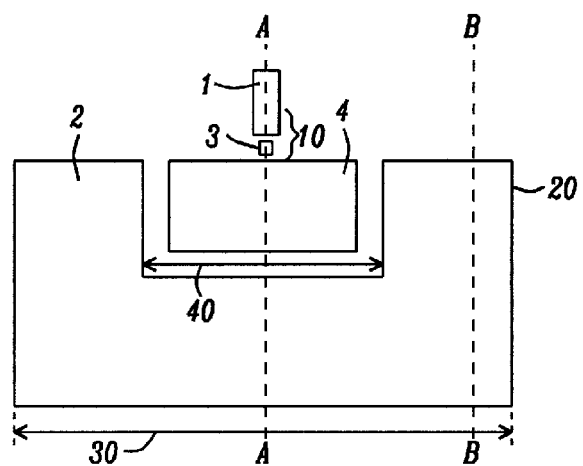
Figure 3D:
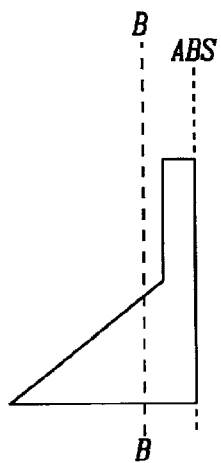
Figure 4:
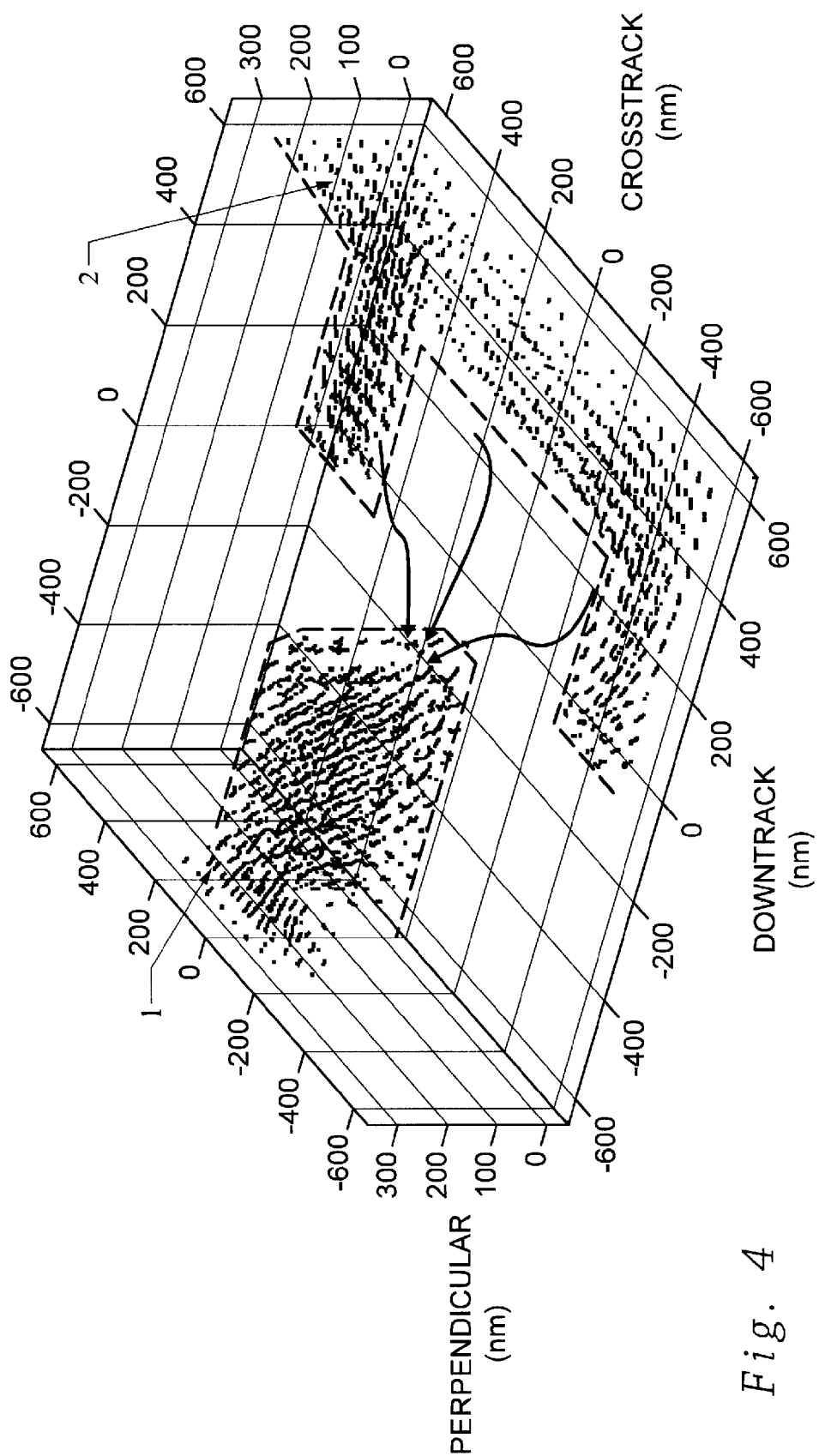
FIG. 4 is the results of a simulation showing the flux paths between the MP and the concave leading shield and the magnetizations within the shield and pole.
Figure 5A:
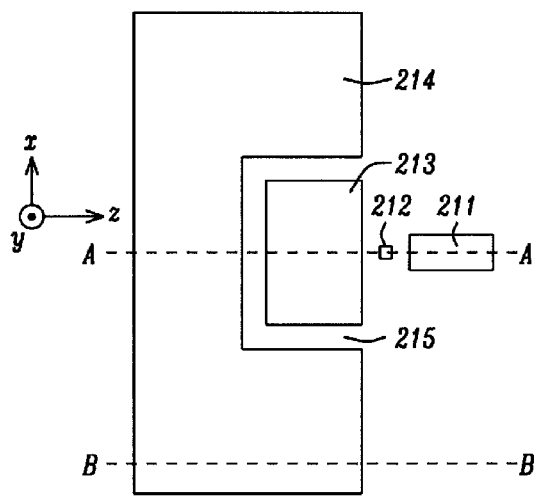
FIGS. 5(a)-5(c) are schematic cross-sectional views of a TAMR writer formed according to Embodiment 1 of the present application.

Referring first to FIG. 5(a), there is shown schematically an ABS view (in an x-z plane) of a first embodiment of a TAMR writer shielded with a concave leading shield apparatus that meets the objects of the disclosure. The Cartesian axes identify x as the cross-track direction, z as the down-track direction and y as a vertical direction, towards the ABS plane. Two broken lines, A and B, pass through the figure and will be used to define the planar cross-sections for FIGS. 5(b) and 5(c) respectively. The CLS is here denoted (214), the WG is denoted (213), the tip of the PG is denoted (212) and the pole tip is denoted (211). Note that we employ a PG that is closely coupled to the pole tip to maximize the overlap of the thermal spot and the writing area. The concave shape of the CLS (214) allows the waveguide (213) to extend to the ABS for maximal transfer of optical power and it can be placed close to the PG (212) for good coupling efficiency. In the ABS plane the CLS wraps around the WG and keeps a certain distance from it (215) to minimize any adverse effect on the optical and thermal efficiency. The cross-sectional shape of the CLS, as shown in FIG. 5(c) is tapered (217) towards its rear side (away from the ABS) in the cross-track direction. The side extensions of the CLS, to either side of the WG, is not tapered and is of uniform thickness, shown as 218 in 5(c). The space between the CLS and the WG is approximately 100 nm in width. As was shown previously in FIG. 2(a), the CLS is attached to the pedestal (5), and the magnetic pole (1) is attached to the yoke (8). When the head is energized (driven) by a current, the magnetic field is enhanced by the CLS as a result of the reduction of the air gap between the CLS and the pole.

Figure 5B:
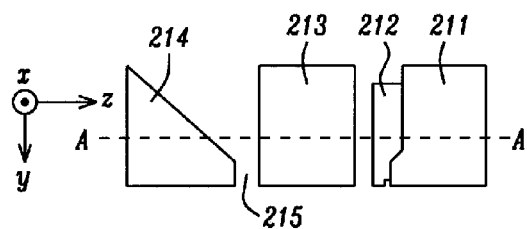
Figure 5C:
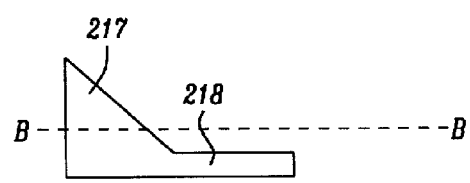

Referring to FIG. 5(b), there is shown the y-z cross-sectional plane through A showing all the elements in FIG. 5(a).

Referring to FIG. 5(c) there is shown the y-z cross-sectional plane through B, in which only the cross-section of the CLS (214) is seen. Inspection of FIGS. 5(b) and 5(c) indicate that the cross-section of the CLS has a triangular (tapered) base as discussed above (shown as (217) in 5(c)) with a uniform rectangular width portion (shown as (218) in 5(c)) extending vertically from the base.

Relevant dimensions of the elements described above (and below) are:
WG: x-dimension approximately 600 nm, z-dimension approximately 400 nm
CLS: inner opening x-dimension approximately 800 nm, z-dimension approximately 500 nm. Outer x-dimension>2000 nm.
CLS thickness y-dimension between 200 and 500 nm.
Pole tip: x-dimension approximately 100 nm.

Embodiment 2

Figure 6A:
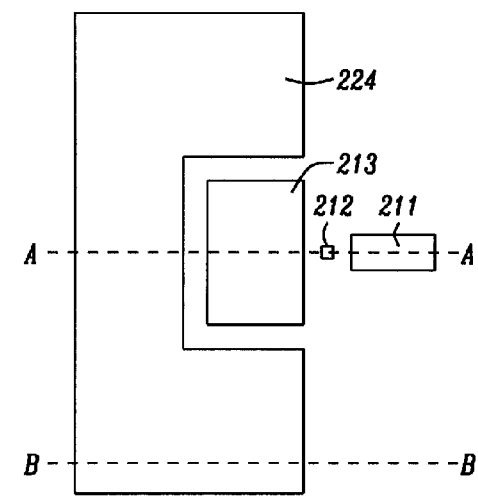
FIGS. 6(a)-6(c) are schematic cross-sectional views of a TAMR writer formed according to Embodiment 2 of the present application.

Referring first to FIG. 6(a), there is shown an ABS view (in an x-z plane) of embodiment 2 of a TAMR writer shielded with a concave leading shield apparatus that meets the objects of the disclosure. The Cartesian axes identify x as the cross-track direction, z as the down-track direction and y as a vertical direction, towards the ABS plane. Two broken lines, A and B, pass through the figure and will be used to define the planar cross-sections for FIGS. 5(b) and 5(c) respectively. The CLS is (224), the WG is (213), the tip of the PG is (212) and the pole tip is (211). Note that we employ a PG that is closely coupled to the pole tip to maximize the overlap of the thermal spot and the writing area. The space between the CLS and the WG is approximately 100 nm in width. Every feature of this embodiment is the same as the embodiment 1, except that the CLS is of uniform thickness. The uniformity of thickness (zero taper angle compared to FIGS. 5(b) and 5(c)) may prove to be a simpler shape to fabricate in planar process integration.

Figure 6B:
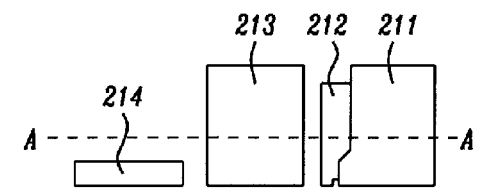
Figure 6C:
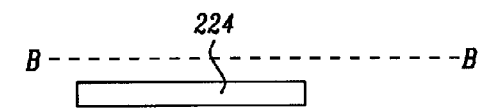

Referring to FIG. 6(*b*), there is shown the y-z cross-sectional plane through A showing all the elements in FIG. 6(*a*).

Referring to FIG. 6(*c*) there is shown the y-z cross-sectional plane through B, in which only the cross-section of the CLS (214) is seen. It can be seen from 6(*b*) and 6(*c*) that the CLS in this embodiment has a uniform thickness.

Relevant dimensions of the elements described above (and below) are:
WG: x-dimension approximately 600 nm, z-dimension approximately 400 nm
CLS: inner opening x-dimension approximately 800 nm, z-dimension approximately 500 nm. Outer x-dimension>2000 nm.
CLS thickness y-dimension between 200 and 500 nm.
Pole tip: x-dimension approximately 100 nm.

Embodiment 3

Referring first to FIG. 7(*a*), there is shown an ABS view (in an x-z plane) of Embodiment 3 of a TAMR writer shielded with a concave leading shield apparatus that meets the objects of the disclosure. The Cartesian axes identify x as the cross-track direction, z as the down-track direction and y as a vertical direction towards the ABS plane. Two broken lines, A and B, pass through the figure and will be used to define the planar cross-sections for FIGS. 5(*b*) and 5(*c*) respectively. The CLS is (234), the WG is (213), the tip of the PG is (212) and the pole tip is (211). Note that we employ a PG that is closely coupled to the pole tip to maximize the overlap of the thermal spot and the writing area. The space between the CLS and the WG is approximately 100 nm in width. This embodiment is in every respect the same as embodiment 1 except that the CLS (224) has a uniform taper angle along the entire back surface of the CLS (224) as shown in 7(*b*) and 7(*c*). Because of the uniform taper angle, the flux flow is smoother. However, there is the potential to lose optical efficiency if the amount of CLS material surrounding the WG is too large.

Relevant dimensions of the elements described above are:
WG: x-dimension approximately 600 nm, z-dimension approximately 400 nm
CLS: inner opening x-dimension approximately 800 nm, z-dimension approximately 500 nm. Outer x-dimension>2000 nm.
CLS thickness y-dimension between 200 and 500 nm.
Pole tip: x-dimension approximately 100 nm.

Referring to FIG. 7(*b*), there is shown the y-z cross-sectional plane through A showing all the elements in FIG. 7(*a*).

Referring to FIG. 7(*c*) there is shown the y-z cross-sectional plane through B, in which only the cross-section of the CLS (234) is seen. The shape of the cross-section is defined by a uniform taper angle.

Embodiment 4

Referring first to FIG. 8(*a*), there is shown an ABS view (in an x-z plane) of a first embodiment of a TAMR writer shielded with a concave leading shield apparatus that meets the objects of the disclosure. The Cartesian axes identify x as the cross-track direction, y as the down-track direction and z as a vertical direction. Two broken lines, A and B, pass through the figure and will be used to define the planar cross-sections for FIGS. 8(*b*) and 8(*c*) respectively. The CLS is (244), the WG is (213), the tip of the PG is (212) and the pole tip is (211). Note that we employ a PG that is closely coupled to the pole tip to maximize the overlap of the thermal spot and the writing area. As can be seen, the difference between this embodiment and the previous embodiments is that the opening in the CLS has a circular or elliptical perimeter that surrounds the WG. The cross sectional shape (non-uniform taper angle) is the same as that in Embodiment 1.

Referring to FIG. 8(*b*), there is shown the y-z cross-sectional plane through A showing all the elements in FIG. 8(*a*).

Referring to FIG. 8(*c*) there is shown the y-z cross-sectional plane through B, in which only the cross-section of the CLS is seen in its two portions (247) and (248) (non-uniform taper angle). The cross-section is the same as that in Embodiment 1, except that the portion of uniform thickness (248) has a curved perimeter.

Relevant dimensions of the elements described above are:
WG: x-dimension approximately 600 nm, z-dimension approximately 400 nm
CLS: inner opening x-dimension approximately 800 nm, z-dimension approximately 500 nm. Outer x-dimension>2000 nm.
CLS thickness y-dimension between 200 and 500 nm.
Pole tip: x-dimension approximately 100 nm.

As is understood by a person skilled in the art, the embodiments of the present disclosure are illustrative of the present disclosure rather than being limiting of the present disclosure. Revisions and modifications may be made to methods, processes, materials, structures, and dimensions through which is formed a TAMR write head with a concave leading shield, while still providing such a TAMR write head, formed in accord with the present invention as defined by the appended claims.

What is claimed is:

1. A method of forming a thermal assisted magnetic recording (TAMR) write head, comprising:
   providing a writer substrate including a return pole, a main pole, a plasmon generator formed on said main pole, a back gap, a yoke and a coil wrapped around said backgap to activate said pole;
   forming a pedestal on said return pole;
   polishing a surface of said pedestal using a chemical-mechanical polishing (CMP) process;
   plating a leading shield on said pedestal;
   etching an inner opening in said leading shield using an ion beam etch (IBE)/reactive ion etch (RIE) process, thereby producing a concave shape of said leading shield; and
   forming a waveguide, wherein a distal end of said waveguide passes through said inner opening in said leading shield and terminates at an air bearing surface (ABS) and wherein a portion of said terminating distal end of said waveguide is thereby parallel to and overlapping with said plasmon generator.

2. The method of claim 1 wherein said leading shield has the inner opening having a cross-track dimension of approximately 800 nm, a down-track dimension of approximately 500 nm, an overall outer cross-track dimension that exceeds 2000 nm and a thickness in a vertical direction of between approximately 200 and 500 nm.

3. The method of claim 1 wherein said leading shield has the inner opening having a periphery whose shape is rectangular, circular or elliptical.

4. The method of claim 1 wherein a cross-sectional shape of said leading shield in a plane transverse to said ABS plane has a truncated triangle portion with a uniform taper and wherein said taper terminates and a portion of uniform thickness thereupon extends in a z-direction from said uniform taper of said truncated triangle and wherein said uniform thickness portion characterizes sides of said concave leading shield and wherein said truncated triangle portion contacts said pedestal.

5. The method of claim 1 wherein said leading shield is formed of magnetic material having a saturation moment that does not exceed 19 kG.

\* \* \* \* \*